Feb. 3, 1942.   H. J. HASBROUCK, JR., ET AL   2,271,976
PHONOGRAPH APPARATUS
Filed March 30, 1940
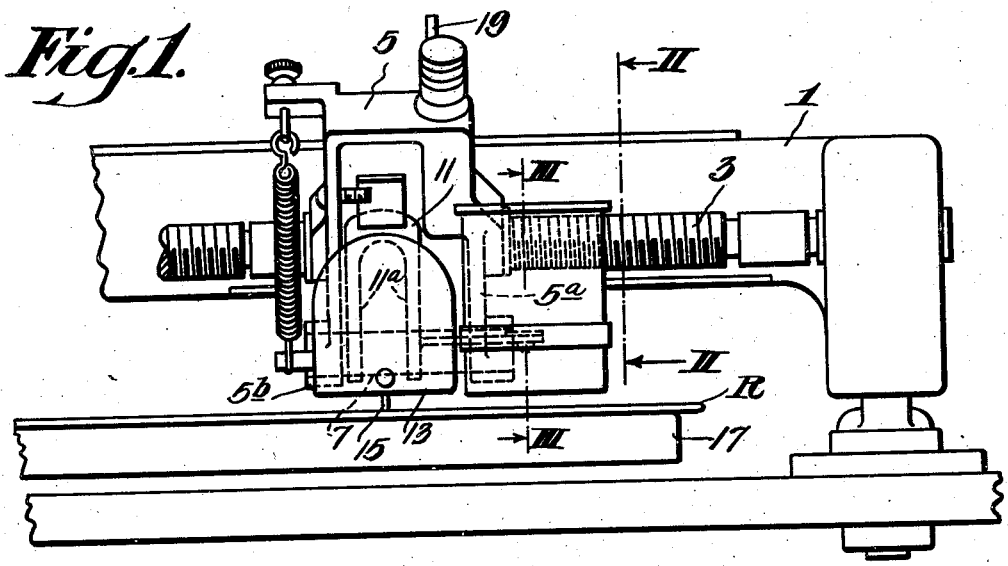
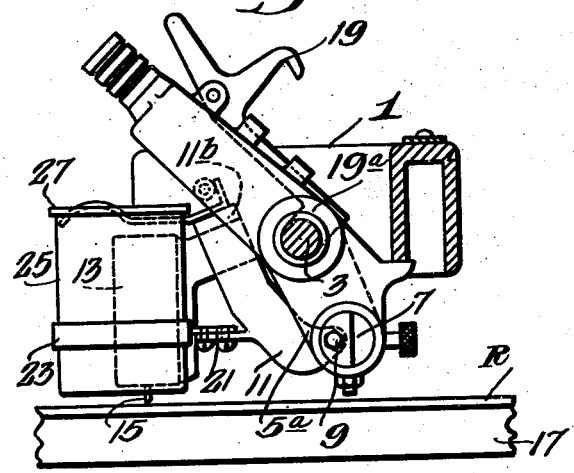
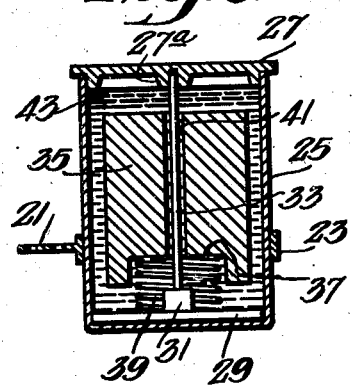
Inventors
Harold J. Hasbrouck Jr.
& Sten E. Bartelson
By
Attorney Patented Feb. 3, 1942

2,271,976

UNITED STATES PATENT OFFICE 2,271,976

PHONOGRAPH APPARATUS

Harold J. Hasbrouck, Jr., Merchantville, N. J., and Sten E. Bartelson, Indianapolis, Ind., assignors to Radio Corporation of America, a corporation of Delaware Application March 30, 1940, Serial No. 326,897

3 Claims. (Cl. 188—1)

This invention relates to phonographic apparatus, and more particularly to recording apparatus used in recording upon blank discs or cylinders which may be played back immediately after recording, the present invention being an improvement upon that disclosed and claimed in the copending application of Edward C. Conrad, Serial No. 253,920, filed January 31, 1939, and assigned to Radio Corporation of America.

In the said copending application, there is disclosed a recording machine wherein the recording head is carried on a pivotally mounted cradle and is fed across the record by a feed screw driven from the turntable spindle. In this type of machine, an "advance ball" or pre-grooving needle is not always employed, the cutting needle itself forming the groove as it cuts the sound groove in the record blank. With such an arrangement, it has been found that the recording head partakes of slight vertical oscillations or "resonant flutter" at the resonant frequency of the dynamic compliance of the record blank being cut and the mass of the recording head. The recording head and its cradle may also be caused to oscillate slightly in a vertical direction in response to irregularities in the surface of the blank being cut, or because of vibration induced, for example, by building rumble, or the like. This is especially troublesome when recording on lacquer coated discs where the use of an "advance ball" is not practical. As a result, distortion results when the record is reproduced.

The primary object of our invention is to provide an improved recorder head mounting which will be free from the aforementioned difficulties.

More specifically, it is an object of our invention to provide an improved recorder head mounting which will not oscillate in the manner noted above.

It is also an object of our present invention to provide improved means for preventing oscillation of the recorder head which can easily be attached to existing recorders.

In a preferred embodiment of our invention, we secure one end of a short arm to the recording head supporting cradle in a manner such that the arm extends to one side of the recording head, and we mount on the free end of said arm a casing which is sealed from the atmosphere and which may constitute a cylinder. A guide rod is fixedly mounted within the cylinder and extends axially therein from end to end, a relatively heavy mass, such as a lead piston, being mounted on the guide rod for sliding movement thereon within the cylinder. The diameter of the piston is smaller than the internal diameter of the cylinder so that a space is left between the piston and the cylinder walls. Also, the axial bore in the heavy mass or piston has a diameter which is slightly greater than the diameter of the guide rod. The massive piston normally rests on a weak coil spring which is of a strength just sufficient to overcome the effect of gravity on the piston, and the casing is substantially filled with oil or other suitable viscous fluid so as to fill the space between the guide rod and the bore in the piston on the one hand and the space between the piston and the walls of the cylindrical casing on the other hand.

It will be seen, from the foregoing brief description, that the heavy piston is entirely immersed in oil. When, during operation, the recording head tends to oscillate in a vertical direction, it will carry with it the cylindrical casing, but the massive piston will tend to stand still by reason of its inertia. This causes the oil or the like to circulate from one end of the cylinder to the other around the mass or piston to provide viscous friction and thus damp the oscillations. Since the coil spring merely supports the piston to overcome the effect of gravity, it does not have any damping effect.

The novel features that we consider characteristic of our invention are set forth with particularity in the appended claims. The invention itself, however, both as to its organization and method of operation, as well as additional objects and advantages thereof, will best be understood from the following description of one embodiment thereof when read in connection with the accompanying drawing in which Figure 1 is a front elevation of a recorder embodying one form of our invention, Figure 2 is a sectional view taken on the line II—II of Figure 1, and Figure 3 is a central sectional view of our improved stabilizer taken on the line III—III of Fig. 1.

Referring more particularly to the drawing, wherein similar reference characters designate corresponding parts throughout, there is shown a frame 1 which rotatably carries a feed screw 3 on which a carriage 5 is slidably and rotatably mounted. The carriage 5 is provided with a pair of downwardly extending arms 5a which terminate in a pair of aligned bearing members 5b on which is rotatably mounted a bearing 7. Eccentrically mounted on the bearing member 7 are a pair of conically tipped screws 9 which pivotally carry a cradle 11 in a manner more fully described in the above noted copending application of Edward C. Conrad. The cradle 11 comprises a substantially U-shaped member having parallel side arms 11a and a cross arm 11b, to the latter of which is secured a sound translating device 13, such as a recording head provided with a needle or cutter 15 for cooperation with a record R on a turntable 17.

Pivotally mounted on the carriage 5 is a feed lever 19 which, at its lower end, is provided with a half nut 19a adapted to engage the feed screw 3 to provide driving engagement therebetween so that the assembly or unit comprising the recorder head 13, its cradle 11, the carriage 5 and the lever 19 may be fed across the record R by the feed screw 3.

Secured to the cradle 11 and extending laterally to one side thereof is an arm 21 formed at its outer end with a collar 23 which carries a hollow cylindrical casing 25, a cover 27 being force fit into the upper end of the casing 25 so as to seal the interior thereof from the atmosphere. A disc 29 which snugly fits within the cylinder 25 rests on the bottom thereof and is provided with a collar or hub 31 from which extends a guide rod 33. The upper end of the guide rod 33 is received in the bore of a hub 27a on the cover 27, so that the guide rod 33 is fixed within the casing 25 and extends substantially centrally thereof along its axis.

Slidably mounted in the casing 25 for longitudinal or vertical movement therein is a heavy mass or piston 35 which may be formed of lead or any other heavy metal. The piston 35 is formed with a seat 37 in the bottom thereof, the upper end of a relatively weak coil spring 39 which rests on the disc 29 and surrounds the hub 31 being received within the seat 37. Thus, the piston 35 normally rests on the spring 39, the strength of the spring 39 being just sufficient to overcome the effect of gravity on the massive piston 35.

The diameter of the piston 35 is appreciably smaller than the internal diameter of the casing 25 and it is considerably shorter than the casing 25 so that a space is provided all around the piston between it and the cylinder or casing 25. This space has been exaggerated in the drawing for the sake of clearness. The piston 35 is also provided with a central bore 41 through which the rod 33 extends and which has a diameter slightly greater than that of the rod 33. The cylindrical casing 25 is filled with oil or other suitable viscous medium 43 which fills all the space between the cylinder 25 and the piston 35 in every direction, as well as that portion of the bore 41 not occupied by the guide rod 33. It is obvious, from the foregoing description, that the piston 35 cannot rub against the walls of the cylinder 25 and that it will slide easily along the guide rod 33, the latter preventing the piston 35 from moving up against the walls of the cylindrical casing 25.

In the operation of our improved vibration damper, when the recording head 13 tends to oscillate, it will move the casing 25 with it. However, the massive piston 35 will tend to remain still by reason of its great inertia, and the oil 43 will pass around the piston 35 from one end of the casing 25 to the other, thus providing viscous friction, or mechanical resistance, for damping the oscillations of the recorder head. Our improved damping or stabilizing device need not be tuned to any particular frequency when the casing 25 is filled with oil, and it is effective over a wide range.

Although we have shown and described but one form of our invention, it will be obvious to those skilled in the art that many other modifications, as well as changes in that described, are possible. We, therefore, do not wish to be limited except insofar as is made necessary by the prior art and by the spirit of the appended claims.

We claim as our invention:

1. A vibration stabilizer for a phonographic sound translating head which comprises a hollow casing sealed from the atmosphere, a guide rod extending substantially axially therethrough, a mass having an axial bore extending therethrough of a diameter greater than that of said guide rod, said guide rod extending through said bore whereby said mass is slidable on said guide rod, said mass also being shorter than and having a smaller cross sectional dimension than said casing whereby it is spaced from said casing in all directions, a relatively weak spring on the bottom of said casing normally supporting said mass, and a liquid damping medium substantially filling the space within said casing which is unoccupied by said mass, said guide rod and said spring.

2. The invention set forth in claim 1 characterized in that said spring has a stiffness of a magnitude just sufficient to enable it to overcome the effect of gravity on said mass.

3. In phonographic apparatus which includes a translating device normally subject to slight mechanical vibrations when cooperating with a record, a vibration inhibitor for said device which comprises a supporting arm adapted to have connection with said device, a hollow casing carried by said arm and sealed from the atmosphere, a spring on the bottom of said casing, a mass within said casing normally resting on said spring, said mass having an axial bore therein, a guide rod of smaller diameter than said bore extending through said bore and in spaced relation thereto, said mass being of smaller dimension than said casing in all directions whereby said mass is spaced from said casing in all directions and is freely slidable on said rod between the ends of said casing, and a liquid damping medium surrounding said mass and filling the space within said bore not occupied by said guide rod.

HAROLD J. HASBROUCK, Jr.
STEN E. BARTELSON.